(12) United States Patent
Huebner et al.

(10) Patent No.: US 10,693,594 B2
(45) Date of Patent: Jun. 23, 2020

(54) COMMUNICATION DEVICE AND METHOD FOR STORING DATA

(71) Applicant: Intel IP Corporation, Santa Clara, CA (US)

(72) Inventors: Axel Huebner, Munich (DE); Thomas Ilnseher, Munich (DE); Lars Melzer, Dresden (DE); Uwe Pross, Chemnitz (DE)

(73) Assignee: Apple Inc., Cupertino, CA (US)

(*) Notice: Subject to any disclaimer, the term of this patent is extended or adjusted under 35 U.S.C. 154(b) by 38 days.

(21) Appl. No.: 15/738,617

(22) PCT Filed: May 12, 2016

(86) PCT No.: PCT/US2016/031954
§ 371 (c)(1),
(2) Date: Dec. 21, 2017

(87) PCT Pub. No.: WO2016/209396
PCT Pub. Date: Dec. 29, 2016

(65) Prior Publication Data
US 2018/0183547 A1   Jun. 28, 2018

(30) Foreign Application Priority Data
Jun. 23, 2015   (DE) ........................ 10 2015 110 027

(51) Int. Cl.
*H04L 1/00*   (2006.01)
*H04L 1/08*   (2006.01)
(Continued)

(52) U.S. Cl.
CPC .............. *H04L 1/08* (2013.01); *H04L 1/1812* (2013.01); *H04L 1/1835* (2013.01);
(Continued)

(58) Field of Classification Search
CPC . H04L 1/08; H04L 1/18; H04L 1/1812; H04L 1/1835; H04L 1/1854; H04L 1/005;
(Continued)

(56) References Cited

U.S. PATENT DOCUMENTS 9,204,437 B2 * 12/2015 Smee ................... H04W 72/042
9,264,938 B2 *  2/2016 Perets ...................... H04L 69/04
(Continued)

FOREIGN PATENT DOCUMENTS

DE          10026927 A1    12/2001

OTHER PUBLICATIONS

International Search Report based on application No. PCT/US2016/031954 (11 pages) dated May 12, 2016 (Reference Purpose Only).
(Continued)

*Primary Examiner* — Albert Decady
*Assistant Examiner* — Osman M Alshack
(74) *Attorney, Agent, or Firm* — Kowert, Hood, Munyon, Rankin & Goetzel, P.C.

(57) ABSTRACT

A communication device is described including a memory, a receiver configured to receive data via a communication channel and a controller configured to determine whether the communication device is to request a retransmission for the received data, to store the received data in the memory if the communication device is to request a retransmission for the received data and to prevent storing of the received data in the memory if the communication device is to omit a request for a retransmission for the received data.

24 Claims, 6 Drawing Sheets

(51) Int. Cl.
  *H04L 1/18* (2006.01)
  *H04W 84/04* (2009.01)

(52) U.S. Cl.
  CPC .......... *H04L 1/1854* (2013.01); *H04L 1/1864* (2013.01); *H04L 1/005* (2013.01); *H04L 1/0066* (2013.01); *H04W 84/042* (2013.01)

(58) Field of Classification Search
  CPC ... H04L 1/0066; H04L 1/1864; H04W 84/042
  USPC .................................................. 714/746–750
  See application file for complete search history.

(56) References Cited

U.S. PATENT DOCUMENTS

| | | | |
|---|---|---|---|
| 2003/0161280 A1 | 8/2003 | Gruhn et al. | |
| 2007/0155335 A1* | 7/2007 | Love ................ | H04W 52/52 455/69 |
| 2007/0168827 A1* | 7/2007 | Lohr ................ | H04L 1/1845 714/749 |
| 2009/0003301 A1* | 1/2009 | Reial ................ | H04L 1/0038 370/342 |
| 2009/0228755 A1* | 9/2009 | Franovici ........... | H04L 1/1816 714/751 |
| 2010/0058132 A1* | 3/2010 | Kumar P R ......... | H04L 1/0025 714/748 |
| 2010/0290419 A1* | 11/2010 | Wengerter .......... | H04W 72/042 370/329 |
| 2010/0309870 A1* | 12/2010 | Wengerter .......... | H04L 1/1893 370/329 |
| 2011/0185249 A1* | 7/2011 | Jongren ............. | H04L 1/0003 714/748 |
| 2013/0013970 A1 | 1/2013 | Tao et al. | |
| 2013/0042073 A1 | 2/2013 | Tao | |
| 2013/0151920 A1* | 6/2013 | Mayrench .......... | H04L 1/0053 714/748 |
| 2013/0272192 A1 | 10/2013 | Chang et al. | |
| 2014/0256365 A1* | 9/2014 | Schmidt ............. | H04W 4/90 455/466 |
| 2014/0281843 A1* | 9/2014 | Lo ................... | G06F 11/08 714/807 |

OTHER PUBLICATIONS

German Office Action based on application No. 10 2015 110 027.4 (7 pages) dated Mar. 24, 2016 (Reference Purpose Only).

\* cited by examiner

FIG 6

COMMUNICATION DEVICE AND METHOD FOR STORING DATA

RELATED APPLICATIONS

The present application is a national stage entry according to 35 U.S.C. § 371 of PCT application No.: PCT/US2016/031954 filed on May 12, 2016, which claims priority from German application No.: 10 2015 110 027.4 filed on Jun. 23, 2015, and is incorporated herein by reference in its entirety.

TECHNICAL FIELD

Embodiments described herein generally relate to communication devices and methods for storing data.

BACKGROUND

In a mobile phone, the soft channel bit storage requirement for a communication connection typically increases significantly with the data rate of the communication connection. For a memory used for the storage, there typically exist high requirements in terms of bandwidth and latency. It is desirable to reduce these requirements to reduce power consumption and cost.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
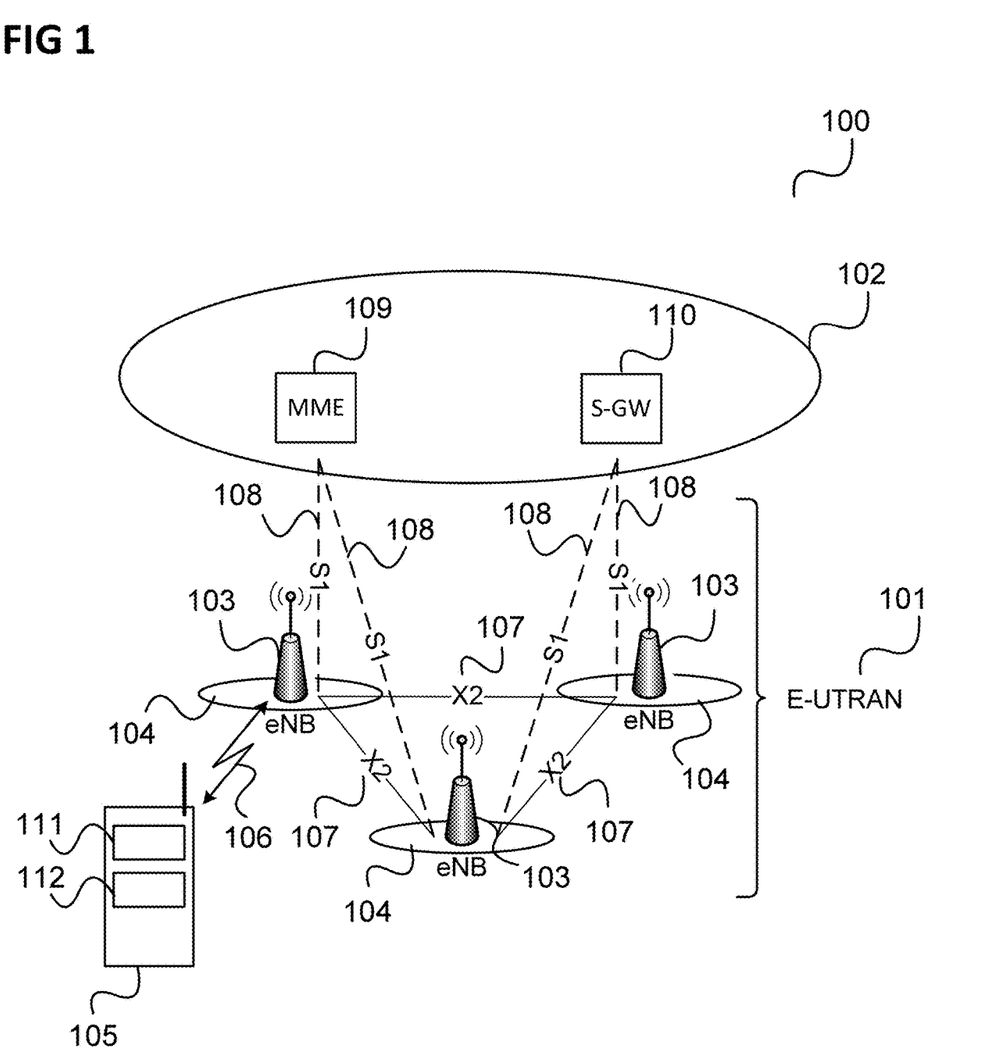
FIG. 1 shows a communication system.

FIG. 1 shows a communication system 100, for example according to 3GPP (Third Generation Partnership Project).

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications), WIFI etc.

A mobile terminal (e.g. a UE) 105 located in a mobile radio cell 104 may communicate with the core network 102 and with other mobile terminals via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105. The mobile terminal 105 includes, among other typical components such as a speaker and a microphone and an LTE modem 111 and a memory 112. The LTE modem 111 is for example implemented by means of a modem chip and may include an on-chip memory. The memory 112 is an off-chip memory but may for example also be used to store data of the modem chip.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol).

In a cellular modem running, e.g., LTE, as in case of the modem 111 in the example of FIG. 1, soft channel bit storage requirement typically significantly increases with the category supported and hence with the data rate supported. This may result in high memory requirements and, if the modem's on-chip memory is used, the requirement for a huge size of the on-chip memory. Here, on-chip memory refers to the memory on the modem chip.

Since on-chip memory is expensive, it is desirable to reduce its size. This may be done by using off-chip memory instead, e.g. the memory 112 in the example of FIG. 1, which is typically much cheaper. However, the high on-chip memory requirements translate into high off-chip memory bandwidth requirements, which also result in high power consumption. Beyond that, there are typically strict latency requirements when accessing the soft channel bit storage during signal processing.

In the following, an example is described which allows reducing the requirements for a (e.g. off-chip) memory.

Figure 2:
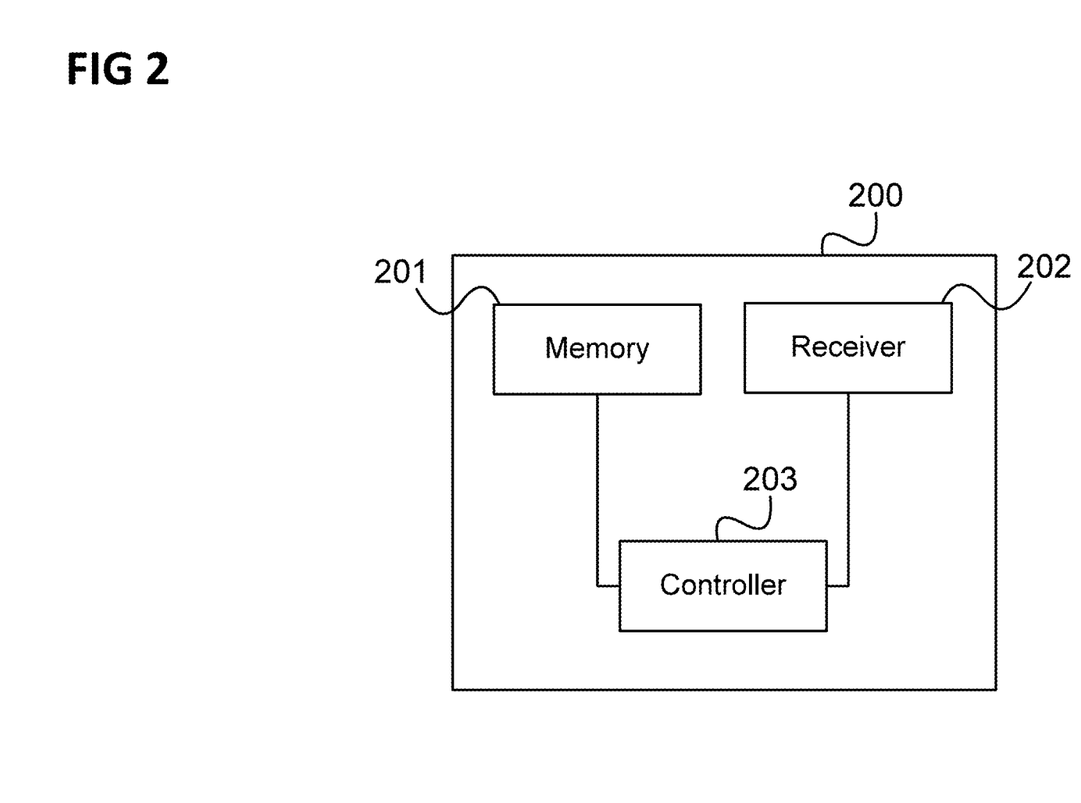
FIG. 2 shows a communication device.

FIG. 2 shows a communication device 200.

The communication device 200 includes a memory 201 and a receiver 202 configured to receive data via a communication channel.

The communication device further includes a controller 203 configured to determine whether the communication device is to request a retransmission for the received data and to store the received data in the memory if the communication device is to request a retransmission for the received data and to prevent storing of the received data in the memory if the communication device is to omit a request for a retransmission for the received data (i.e. is not to request for a retransmission for the received data).

In other words, a memory (e.g. an off-chip memory) stores received data in case that the received data is insufficient to obtain useful data from the received data (i.e. the useful data that is intended to be transmitted to the communication device by means of the data received as the received data) and the memory is prevented from storing the received data in the memory if the received data is sufficient (possibly in combination with data received earlier) to obtain the useful data (e.g. the memory is controlled to not store the received data if the received data is sufficient to obtain the useful data).

The usage of an off-chip memory for storing received data allows saving costs for an on-chip memory for storing the received data. Without off-chip memory, an on-chip memory would have to be provided that is sufficient to store received data until it can be decided which may result in a high cost, e.g. in terms of chip area. Further, the approach described with reference to FIG. 2 allows the usage of an off-chip memory for storing received data while keeping the requirements in terms of bandwidth and latency of the connection of the off-chip memory to the (e.g. on-chip) receiver low.

The retransmission for the received data is for example a retransmission of the data packet for which an earlier transmission was received as the received data, i.e. an earlier transmission included transmission data for transmitting the data packet (at least partially) which was received as the received data. A retransmission of the data packet may include the same transmission data or different transmission data (e.g. different error correction information) than the earlier transmission of the data packet.

The components of the communication device 200 (e.g. the receiver and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 3:
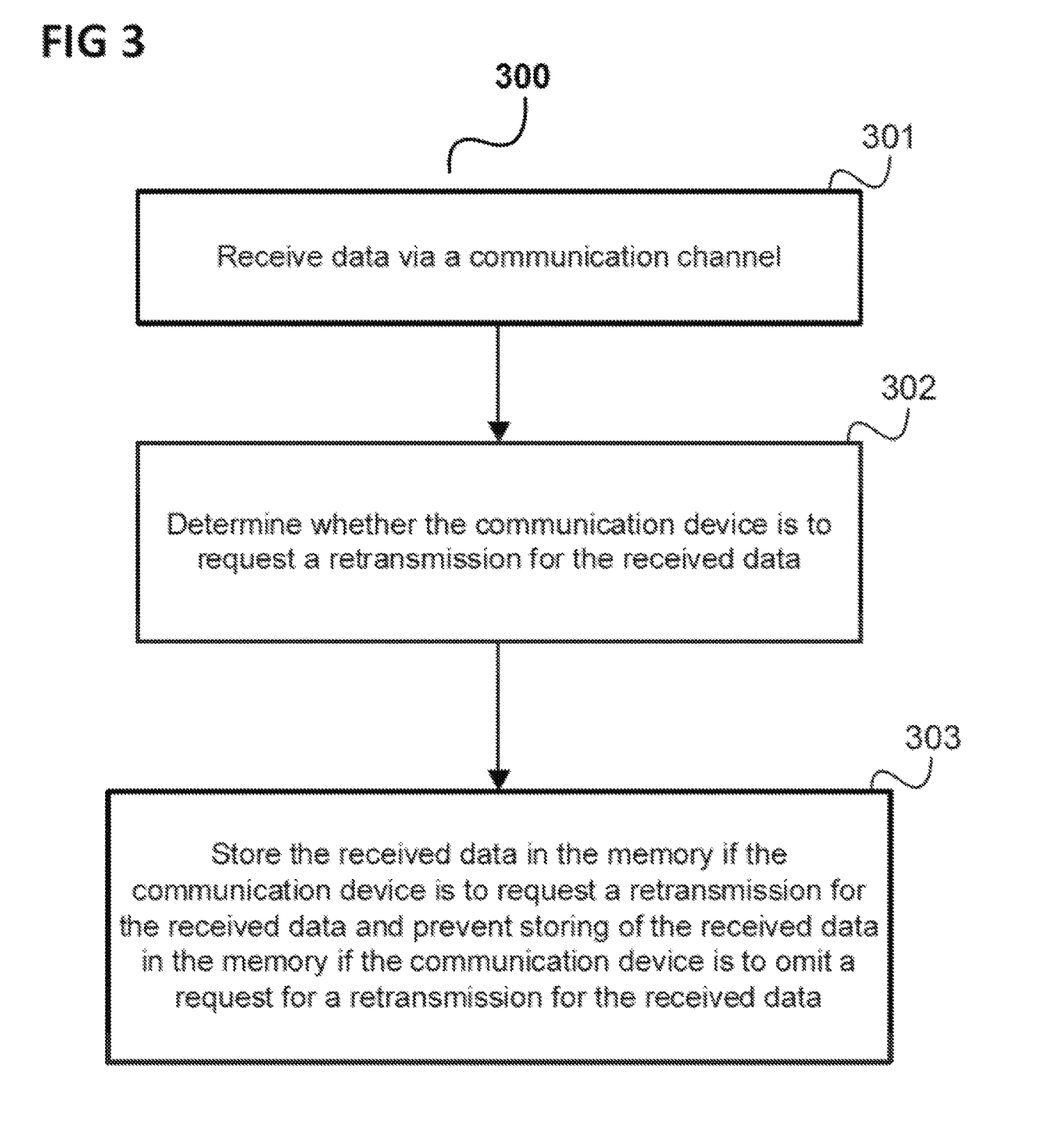
FIG. 3 shows a flow diagram illustrating a method for storing data.

The communication device 200 for example carries out a method for storing data as illustrated in FIG. 3.

FIG. 3 shows a flow diagram 300.

The flow diagram 300 illustrates a method for storing data, for example performed by a communication device.

In 301, the communication device receives data via a communication channel.

In 302, the communication device determines whether it is to request a retransmission for the received data.

In 303, the communication device stores the received data in the memory if the communication device is to request a retransmission for the received data and prevents storing of the received data in the memory if the communication device is to omit a request for a retransmission for the received data.

The following examples pertain to further embodiments

Example 1 being a communication device as illustrated in FIG. 2.

In Example 2, the subject matter of Example 1 can optionally include the receiver being configured to receive the data in accordance with a retransmission protocol and the retransmission being a retransmission according to the retransmission protocol.

In Example 3, the subject matter of Example 2 can optionally include the retransmission protocol being an automatic repeat request protocol.

In Example 4, the subject matter of any one of Examples 2-3 can optionally include the retransmission protocol being a hybrid automatic repeat request protocol.

In Example 5, the subject matter of any one of Examples 2-4 can optionally include the received data being data received in an initial transmission or a retransmission of a data packet according to the retransmission protocol.

In Example 6, the subject matter of Example 5 can optionally include the retransmission for the received data being a retransmission of the data packet.

In Example 7, the subject matter of any one of Examples 5-6 can optionally include the controller being configured to determine whether the communication device is to request a retransmission for the received data based on whether the communication device has received sufficient data for reconstructing useful data of the data packet from a sender of the data packet.

In Example 8, the subject matter of Example 7 can optionally include the controller being configured to determine that the communication device is to request a retransmission for the received data if it is necessary for the communication device to receive additional data for reconstructing the useful data of the data packet from the sender of the data packet.

In Example 9, the subject matter of Example 8 can optionally include the additional data being error correction data for the useful data.

In Example 10, the subject matter of any one of Examples 1-9 can optionally include the receiver being a radio receiver and the communication channel being a radio communication channel.

In Example 11, the subject matter of any one of Examples 1-10 can optionally include a chip implementing at least partially the receiver and including an on-chip memory, wherein the receiver is configured to store the received data in the on-chip memory.

In Example 12, the subject matter of Example 11 can optionally include the receiver being configured to store the received data in the on-chip memory independent of whether the communication device is to request a retransmission for the received data.

In Example 13, the subject matter of any one of Examples 11-12 can optionally include the memory being an off-chip memory with respect to the chip.

In Example 14, the subject matter of any one of Examples 11-13 can optionally include the chip being a modem chip.

In Example 15, the subject matter of any one of Examples 11-14 can optionally include the receiver having a connection to the on-chip memory for storing received data in the on-chip memory that has at least one of lower latency and higher bandwidth than a connection of the memory to the receiver for storing received data in the memory.

In Example 16, the subject matter of any one of Examples 11-15 can optionally include the receiver being configured to, for storing received data in the memory, transfer the received data from the on-chip memory to the memory.

In Example 17, the subject matter of any one of Examples 11-16 can optionally include the receiver being configured to, if the receiver receives the data with a retransmission of a retransmission protocol, update the content of the on-chip memory based on the received data and to transfer data newly received with the retransmission and data updated based on the received data to the memory for storing the received data if the communication device is to request a retransmission for the received data.

In Example 18, the subject matter of any one of Examples 11-17 can optionally include the receiver being configured to receive the data via a retransmission protocol, wherein the on-chip memory has a size that is larger than the retransmission protocol process size but smaller than two times the retransmission protocol process size.

In Example 19, the subject matter of any one of Examples 11-18 can optionally include the controller being configured to, if the receiver receives the data with a retransmission of a data packet, download data received in a previous transmission of the data packet from the memory to the on-chip memory.

In Example 20, the subject matter of Example 19 can optionally include the controller being configured to avoid downloading other data than the data received in a previous transmission of the data packet from the memory to the on-chip memory.

In Example 21, the subject matter of any one of Examples 1-20 can optionally include the receiver being configured to avoid transferring parts of the received data to the memory that are already stored in the memory.

Example 22 is a method for storing data as illustrated in FIG. 3.

In Example 23, the subject matter of Example 22 can optionally include receiving the data in accordance with a retransmission protocol, wherein the retransmission is a retransmission according to the retransmission protocol.

In Example 24, the subject matter of Example 23 can optionally include the retransmission protocol being an automatic repeat request protocol.

In Example 25, the subject matter of any one of Examples 23-24 can optionally include the retransmission protocol being a hybrid automatic repeat request protocol.

In Example 26, the subject matter of any one of Examples 23-25 can optionally include the received data being data received in an initial transmission or a retransmission of a data packet according to the retransmission protocol.

In Example 27, the subject matter of Example 26 can optionally include the retransmission for the received data being a retransmission of the data packet.

In Example 28, the subject matter of any one of Examples 26-27 can optionally include determining whether the communication device is to request a retransmission for the received data based on whether the communication device has received sufficient data for reconstructing useful data of the data packet from a sender of the data packet.

In Example 29, the subject matter of Example 28 can optionally include determining that the communication device is to request a retransmission for the received data if it is necessary for the communication device to receive additional data for reconstructing the useful data of the data packet from the sender of the data packet.

In Example 30, the subject matter of Example 29 can optionally include the additional data being error correction data for the useful data.

In Example 31, the subject matter of any one of Examples 22-30 can optionally include receiving the data by means of a radio receiver, wherein the communication channel is a radio communication channel.

In Example 32, the subject matter of any one of Examples 22-31 can optionally include storing the received data in an on-chip memory of a chip implementing at least partially a receiver receiving the data.

In Example 33, the subject matter of Example 32 can optionally include storing the received data in the on-chip memory independent of whether the communication device is to request a retransmission for the received data.

In Example 34, the subject matter of any one of Examples 32-33 can optionally include the memory being an off-chip memory with respect to the chip.

In Example 35, the subject matter of any one of Examples 32-34 can optionally include the chip being a modem chip.

In Example 36, the subject matter of any one of Examples 32-35 can optionally include the receiver having a connection to the on-chip memory for storing received data in the on-chip memory that has at least one of lower latency and higher bandwidth than a connection of the memory to the receiver for storing received data in the memory.

In Example 37, the subject matter of any one of Examples 32-36 can optionally include, for storing received data in the memory, transferring the received data from the on-chip memory to the memory.

In Example 38, the subject matter of any one of Examples 32-37 can optionally include, if the data is received with a retransmission of a retransmission protocol, updating the content of the on-chip memory based on the received data and transferring data newly received with the retransmission and data updated based on the received data to the memory for storing the received data if the communication device is to request a retransmission for the received data.

In Example 39, the subject matter of any one of Examples 32-38 can optionally include receiving the data via a retransmission protocol, wherein the on-chip memory has a size that is larger than the retransmission protocol process size but smaller than two times the retransmission protocol process size.

In Example 40, the subject matter of any one of Examples 32-39 can optionally include, if the receiver receives the data with a retransmission of a data packet, downloading data received in a previous transmission of the data packet from the memory to the on-chip memory.

In Example 41, the subject matter of Example 40 can optionally include avoiding downloading other data than the data received in a previous transmission of the data packet from the memory to the on-chip memory.

In Example 42, the subject matter of any one of Examples 22-41 can optionally include avoiding transferring parts of the received data to the memory that are already stored in the memory.

Example 43 is a computer readable medium having recorded instructions thereon which, when executed by a processor, makes the processor perform a method for storing data according to any one of Example 22-42.

Example 44 is a communication device including a memory, a receiving means for receiving data via a communication channel and a controlling means for determining whether the communication device is to request a retransmission for the received data, storing the received data in the memory if the communication device is to request a retransmission for the received data and preventing storing of the received data in the memory if the communication device being to omit a request for a retransmission for the received data.

In Example 45, the subject matter of Example 44 can optionally include the receiving means being for receiving the data in accordance with a retransmission protocol and the retransmission being a retransmission according to the retransmission protocol.

In Example 46, the subject matter of Example 45 can optionally include the retransmission protocol being an automatic repeat request protocol.

In Example 47, the subject matter of any one of Examples 45-46 can optionally include the retransmission protocol being a hybrid automatic repeat request protocol.

In Example 48, the subject matter of any one of Examples 45-47 can optionally include the received data being data received in an initial transmission or a retransmission of a data packet according to the retransmission protocol.

In Example 49, the subject matter of Example 48 can optionally include the retransmission for the received data being a retransmission of the data packet.

In Example 50, the subject matter of any one of Examples 48-49 can optionally include the controlling means being for determining whether the communication device is to request a retransmission for the received data based on whether the communication device has received sufficient data for reconstructing useful data of the data packet from a sender of the data packet.

In Example 51, the subject matter of Example 50 can optionally include the controlling means being for determining that the communication device is to request a retransmission for the received data if it is necessary for the communication device to receive additional data for reconstructing the useful data of the data packet from the sender of the data packet.

In Example 52, the subject matter of Example 51 can optionally include the additional data being error correction data for the useful data.

In Example 53, the subject matter of any one of Examples 44-52 can optionally include the receiving means being a radio receiving means and the communication channel being a radio communication channel.

In Example 54, the subject matter of any one of Examples 44-53 can optionally include a chip implementing at least partially the receiving means and including an on-chip memory, wherein the receiving means is for storing the received data in the on-chip memory.

In Example 55, the subject matter of Example 54 can optionally include the receiving means being for storing the received data in the on-chip memory independent of whether the communication device is to request a retransmission for the received data.

In Example 56, the subject matter of any one of Examples 54-55 can optionally include the memory being an off-chip memory with respect to the chip.

In Example 57, the subject matter of any one of Examples 54-56 can optionally include the chip being a modem chip.

In Example 58, the subject matter of any one of Examples 54-57 can optionally include the receiving means having a connection to the on-chip memory for storing received data in the on-chip memory that has at least one of lower latency and higher bandwidth than a connection of the memory to the receiving means for storing received data in the memory.

In Example 59, the subject matter of any one of Examples 54-58 can optionally include the receiving means being for, for storing received data in the memory, transferring the received data from the on-chip memory to the memory.

In Example 60, the subject matter of any one of Examples 54-59 can optionally include the receiving means being for, if the receiving means receives the data with a retransmission of a retransmission protocol, updating the content of the on-chip memory based on the received data and for transferring data newly received with the retransmission and data updated based on the received data to the memory for storing the received data if the communication device is to request a retransmission for the received data.

In Example 61, the subject matter of any one of Examples 54-60 can optionally include the receiving means being for receiving the data via a retransmission protocol, wherein the on-chip memory has a size that is larger than the retransmission protocol process size but smaller than two times the retransmission protocol process size.

In Example 62, the subject matter of any one of Examples 54-61 can optionally include the controlling means being for, if the receiving means receives the data with a retransmission of a data packet, downloading data received in a previous transmission of the data packet from the memory to the on-chip memory.

In Example 63, the subject matter of any one of Examples 54-62 can optionally include the controlling means being for avoiding downloading other data than the data received in a previous transmission of the data packet from the memory to the on-chip memory.

In Example 64, the subject matter of any one of Examples 54-63 can optionally include the receiving means being for avoiding transferring parts of the received data to the memory that are already stored in the memory.

It should be noted that one or more of the features of any of the examples above may be combined with any one of the other examples.

In the following, examples are described in more detail.

Figure 4:
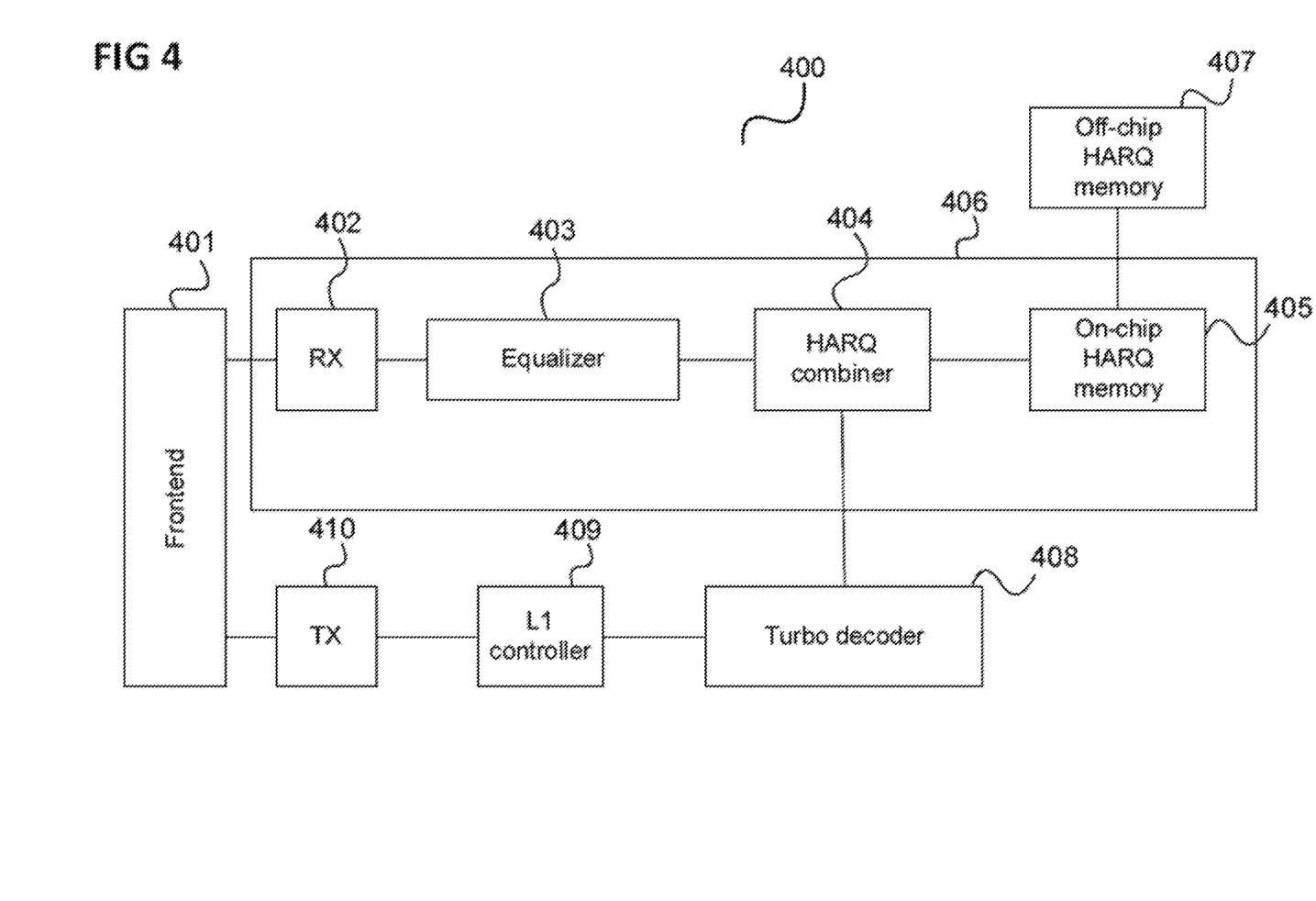
FIG. 4 shows a communication device.

FIG. 4 shows a communication device 400.

The communication device 400 for example corresponds to the mobile terminal 105 and, in this example, uses a HARQ (Hybrid Automatic Repeat Request) scheme. It includes a transceiver frontend 401 which is connected to a receiver 402 (e.g. a receive path of a transceiver) and a transmitter 410 (e.g. a transmit path of the transceiver). Data received by the receiver is equalized by an equalizer 403 and fed to a HARQ combiner (or HARQ unit) 404.

In order to meet the latency requirements and optimize power consumption for soft channel bit storage, a part of the soft channel bit storage memory, i.e. of the HARQ memory, is realized as on-chip HARQ memory 405 and used as a cache. For example, the HARQ combiner 404 and the cache 405 and (at least partially) the receiver 402 and the equalizer 403 (and possibly also one or more of the transmitter 410, the L1 controller 407, and the turbo decoder 408) are located on a modem chip 406.

Data received for a HARQ process are only uploaded to an off-chip HARQ memory 407 of the communication device 400 when the HARQ process cannot be decoded correctly, i.e., the received data of one data packet of one HARQ process (per carrier) is completely stored on-chip (in cache 405) until the CRC (Cyclic Redundancy Check) result for the data packet has been computed, in this example by a turbo decoder 408 which receives the received data from the cache 405 and decodes it. Then, depending on the CRC result, the received data for the HARQ process is uploaded to the off-chip HARQ memory 407 (in case of a CRC fail) or discarded (in case of a CRC pass). In case of a CRC pass the turbo decoder 408 outputs the useful data extracted from the received data by the decoding for further processing. In case of a CRC fail the turbo decoder 408 instructs a layer 1 (L1) controller 409 to request a retransmission for the received data by means of the transmitter 410.

Figure 5:
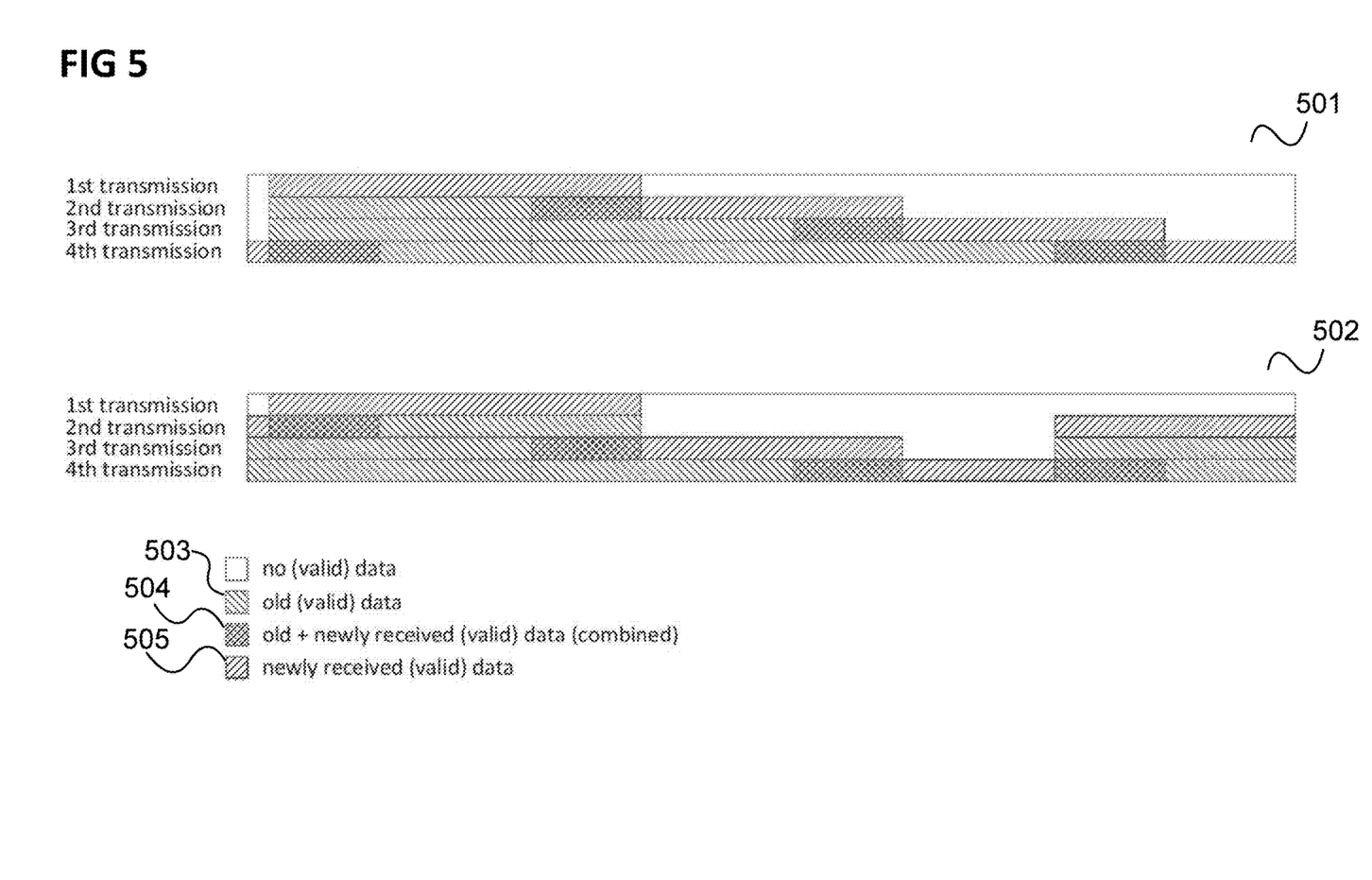
FIG. 5 shows diagrams illustrating examples for different redundancy version sequences for the HARQ memory usage over several transmissions.

FIG. 5 shows a first diagram 501 illustrating a first example and a second diagram 502 illustrating a second example for different redundancy version sequences for the HARQ memory usage over several transmissions.

Each of the diagrams 501, 502 includes four rows wherein each row indicates the state of the occupancy of the cache memory 405 after a first transmission, a second transmission, a third transmission and a fourth transmission of a data packet of a HARQ process, respectively, i.e. after an initial transmission and each one of three retransmissions of the data packet, respectively.

In the diagrams 501, 502, blank sections indicate section of the cache memory 405 reserved for the HARQ process but not filled with valid data of the HARQ process. A first hatching 505 indicates valid data in the cache 405 that is new, i.e., received with a current transmission. Valid data in the cache 405 that is old, i.e., received with a previous transmission of the data packet, is indicated with a second hatching 503. The combination of both, i.e., new data from the current transmission of the data packet and old data from one or more previous transmissions of the data packet are indicated by a third hatching 504.

As can be seen, for different redundancy version sequences different sections of the HARQ memory 405 are updated over the time (transmissions) for a process. It should be noted that in the examples of FIG. 5, the same amount of data is received with each transmission which is in general not the case.

In the example illustrated in FIG. 4, the off-chip memory bandwidth requirements (i.e. the requirements regarding the bandwidth of the connection of the off-chip HARQ memory 407 to the chip 406) and the power consumption may be further reduced by the following (in addition to only storing received data in the off-chip HARQ memory 407 for which there is a CRC fail): Instead of uploading the complete data received for a data packet of a HARQ process to the off-chip HARQ memory 407 (in case of a CRC fail for the HARQ process) only that fraction that is currently received (with the current transmission of the data packet) and updated is stored in the off-chip memory (i.e. the data indicated by the first hatching 505 and the third hatching 503 in FIG. 5). By doing so, the worst-case bandwidth requirement for the off-chip HARQ memory 407 can be relaxed. Moreover, this allows reducing power consumption leading to a more efficient usage of resources.

In the download of data from the off-chip HARQ memory 407 to the chip 406 an approach to reduce the average bandwidth requirement for the off-chip HARQ memory 407, and hence the average power consumption, is to download (i.e. fetch) only that fraction of data that was previously (i.e. in previous transmissions) received (i.e. the data indicated by hatching 503, 504, 505 in FIG. 5) to the on-chip HARQ memory 405.

Using the on-chip HARQ memory 405 in combination with the off-chip HARQ memory 407 as described above the accesses to the off-chip HARQ memory 407, and hence the power consumption, can be kept low. Only when a HARQ process fails the decoding and thus a retransmission is requested, the data received for the HARQ process is uploaded to the off-chip HARQ memory 407.

For example, assuming a target block error rate (BLER) of 10% (target value for adaptive modulation and coding), the interface between the chip 406 to the off-chip HARQ memory 407 is only accessed for every tenth HARQ process on average.

By uploading only that fraction of data that has been modified (newly received or combined values), the traffic from the modem chip 406 to the off-chip HARQ memory 407 and the number of accesses to the off-chip HARQ memory 407 are reduced.

It should be noted that the off-chip HARQ memory 407 may be a part (e.g. a memory area) of an external memory that is not necessarily reserved for off-chip HARQ usage. Other consumers, i.e., other components of the communication device 400 accessing the external memory can benefit from the reduction of traffic and number of accesses by the modem chip 406 by potentially experiencing smaller latency.

For example, For LTE TDD ULDL Cfg0, the process size of a HARQ process (i.e. the size of a data packet to be transmitted by means of an initial transmission and possibly one or more retransmissions) can be as large as 456,768 soft channel bits. However, at the same time, the number of soft channel bits that can be received within one TTI (time transmission interval) cannot be more than 91,200 per layer (assuming at most 2×2 MIMO) due to the limitation of physical resources according to the LTE communication standard (namely, the number of physical resource blocks and the system bandwidth, respectively). This limitation results in at most 40% of a HARQ process independently whether it is an initial transmission or a retransmission. Therefore, this results in a traffic reduction of 60%, which is significant given the high bandwidth requirement.

By downloading only that part of the data received for a HARQ process from the off-chip HARQ memory 407 that contains already received data from a previous transmission of a data packet in case of a retransmission of the data packet, power consumption can be kept low. This is achieved by avoiding both unnecessary read accesses to the off-chip HARQ memory 407 and data transfers between the off chip HARQ memory 407 and the on-chip HARQ memory 405.

For example, for LTE TDD ULDL Cfg0, each HARQ process can be as large as 456,768 soft channel bits. In the first transmission of a data packet, no data is available in the off-chip HARQ memory 407, and hence, no soft channel bits need to be fetched. For the first retransmission of the data packet, the data from the first transmission is fetched, which is at maximum about 40% of the complete HARQ process data (for one data packet). For the second retransmission, about 80% of the complete HARQ process data are fetched, while only from the third retransmission (the fourth overall transmission for this HARQ process), the complete (100%) HARQ process data are fetched. Assuming, e.g., a total of four transmissions for a data packet, this approach reduces the average data rate for the three retransmissions (not considering the initial transmission for which data download can be trivially avoided) from 100% to less than 74%, i.e., more than 26% savings. For two and one retransmission, the savings even increase to more than 40% and 60%, respectively.

Figure 6:
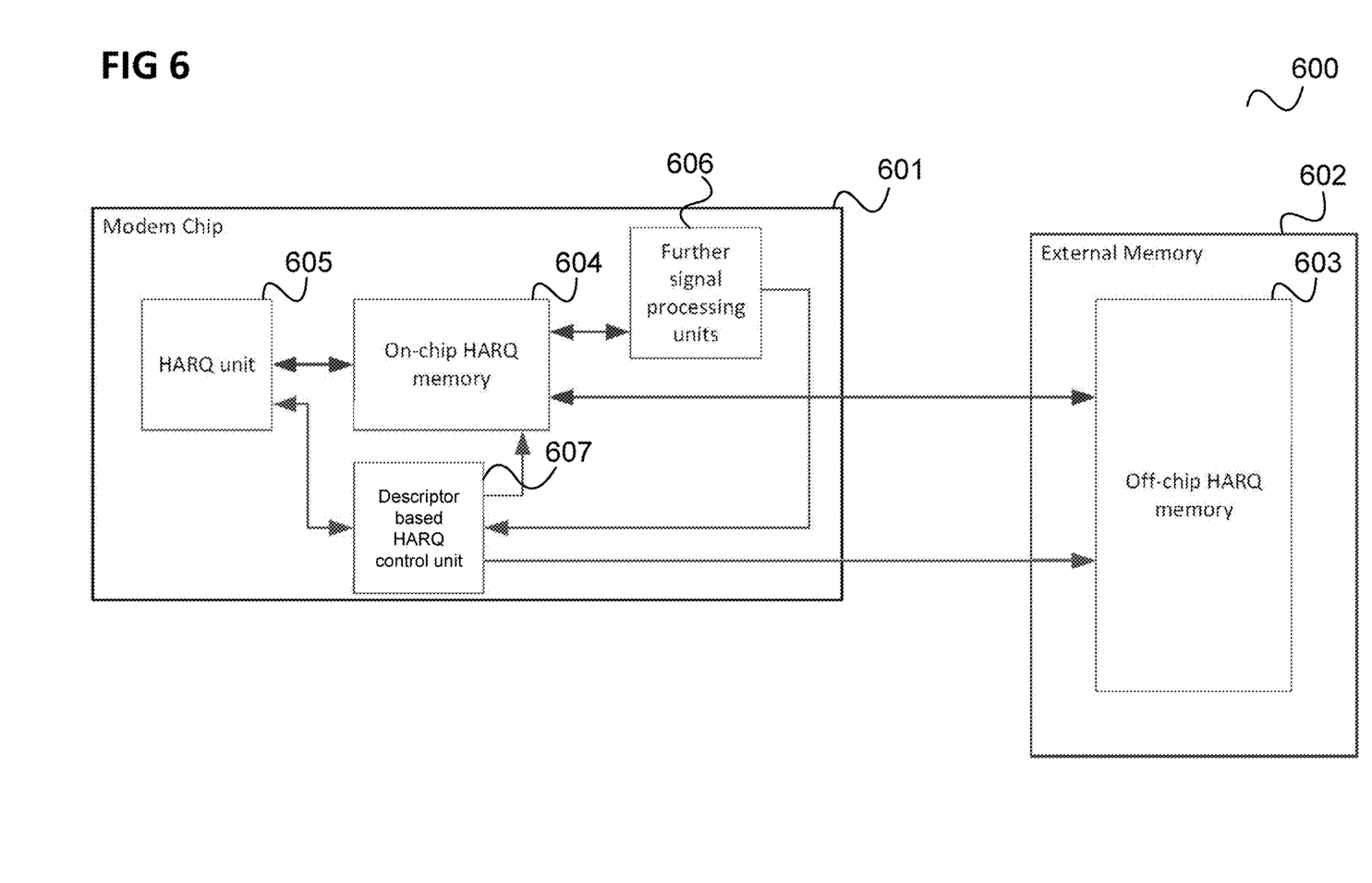
FIG. 6 shows an arrangement including a modem chip and an external memory which illustrates an example of an implementation of a data storage scheme.

FIG. 6 shows an arrangement 600 including a modem chip 601 and an external memory 602 which illustrates an example of an implementation of the data storage scheme described above.

The modem chip 601 for example corresponds to the chip 406 and the external memory 602 includes an off-chip HARQ memory 603 for example corresponding to the off-chip HARQ memory 407.

As in the communication device 400, the modem chip 601 includes an on-chip HARQ memory 604 such that a part of the HARQ memory is realized on-chip while the complete HARQ memory is realized as off-chip HARQ memory 603 as part of the external memory 602. The modem chip 601 further includes a HARQ unit 605 (e.g. corresponding to HARQ combiner 404) and further signal processing units 606 (e.g. including a decoder).

Moreover, the modem chip 601 includes a descriptor based HARQ control unit 607 that controls the upload from the local on-chip HARQ memory 604 to the off-chip HARQ memory 603 as well as the download from the off-chip HARQ memory 603 to the local on-chip HARQ memory 604.

For the usage of the off-chip HARQ memory 603 in connection with the on-chip HARQ memory 604, the decoding result of a HARQ process is checked and only in case of a CRC fail, the HARQ control unit 607 triggers an upload of the received data of the HARQ process from the on-chip HARQ 604 to the off-chip HARQ 603. Otherwise, upon CRC pass, the data received for the HARQ process is discarded. From that it follows that the on-chip HARQ memory 604 is chosen to not be smaller than the data received for one HARQ process (per carrier). For example, the on-chip HARQ memory 604 is chosen to have a size corresponding to the amount of data of one transmission increased by an amount (e.g. by 30%) which allows receiving data for a following HARQ process while the CRC checking for the current HARQ process has not yet been completed.

The descriptor based HARQ memory control unit 607 for example contains logic and memory and is configured to compute, store and update descriptors for every retransmission.

These descriptors can be manifold, such like, e.g., memory address spaces which requires some storage but few logic. Another option is to use, e.g., the redundancy version together with transport block format and HARQ process information and based on this compute the memory address space of the data of interest. This represents a more logic and less memory consuming implementation.

For upload bandwidth optimization, based on the currently received data for a HARQ process, the descriptors for example depend on the currently received data and the corresponding control data for it. The descriptors are for example only used instantaneously and can be discarded afterwards (if only used for upload).

For example, for upload, the descriptor based HARQ memory control unit 607 performs the following For each transmission of a data packet
1. Compute descriptor based on control information for the transmission.
2. Store descriptor until it is needed, i.e., data is uploaded to the off-chip HARQ memory 603.
3. Convert descriptor into memory address space and upload fraction of data as given by descriptor from local operation memory (on-chip HARQ memory 604) to off-chip HARQ memory 603.

The conversion of the descriptor is for example done in such a way that the data can be transmitted from the local on-chip HARQ memory 604 to the off-chip HARQ memory 603. This means that the converted descriptor can be used directly, e.g., to program a DMA (Direct Memory Access) controller to perform the upload.

It should be noted that the descriptors may be extended from purely describing the data of the current transmission to a wider data range at the cost of a bandwidth and power requirement penalty. Basically, every value between the optimum (about 40% for TDD ULDL Cfg0) and the worst case (100%) can be chosen by adapting the descriptors.

For download bandwidth optimizations, based on the data already received for a data packet of a HARQ process, the descriptors depend on every retransmission for each HARQ process.

For example, for download, the descriptor based HARQ memory control unit 607 performs the following For initial transmission of a data packet
1. Set fetch data descriptor for this transmission to "none", i.e., no data are fetched from the HARQ off-chip memory 603.
2. Compute descriptor based on control information for the transmission.
3. Store descriptor for future retransmission of the data packet.

For a retransmission of a data packet
1. Fetch data from off-chip HARQ memory 603 based on previously stored descriptor and recompute memory address space 2. Compute descriptor based on control information for the current transmission
3. Combine stored descriptor with newly computed descriptor
4. Update descriptor and store it for future retransmission of the data packet Apart from fetching the data from the off-chip HARQ memory 603, the descriptor based HARQ memory control unit 607 can also provide control information about the data to the HARQ unit 605 that, amongst others, performs the combining of newly received data with previously received data in case of retransmissions. Here, the descriptor based HARQ memory control unit 607 may for example provide information whether data for HARQ combining is available (i.e. stored from a previous transmission) or not such that the HARQ combining can correctly be performed.

It should be noted that download and upload bandwidth optimizations can be combined such that descriptors for upload bandwidth optimizations are also used as input for the descriptor computation for download bandwidth optimizations.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising:
a chip including an on-chip memory, and implementing, at least partially, a receiver, wherein the receiver is configured to:
  receive data via a communication channel; and
  store the received data in the on-chip memory;
an off-chip memory; and
one or more processors configured to:
  determine whether the communication device is to request a retransmission for the received data,
  store the received data, from the on-chip memory, into the off-chip memory in response to determining the communication device is to request the retransmission for the received data, and
  prevent storing of the received data in the off-chip memory in response to determining the communication device is to omit the request for the retransmission for the received data,
wherein the receiver is configured to receive the data via a retransmission protocol, and
wherein the on-chip memory has a size that is larger than a retransmission protocol process size of the retransmission protocol but smaller than two times the retransmission protocol process size of the retransmission protocol.

2. The communication device of claim 1,
wherein the receiver is configured to receive the data in accordance with a retransmission protocol, and
wherein the retransmission is in accordance with the retransmission protocol.

3. The communication device of claim 2,
wherein the retransmission protocol is an automatic repeat request protocol.

4. The communication device of claim 2,
wherein the retransmission protocol is a hybrid automatic repeat request protocol.

5. The communication device of claim 2,
wherein the receiver is configured to receive the data in an initial transmission of a data packet, or in a retransmission of the data packet in accordance with the retransmission protocol.

6. The communication device of claim 5,
wherein the retransmission for the received data is the retransmission of the data packet.

7. The communication device of claim 5,
wherein the one or more processors are configured to determine whether the communication device is to request the retransmission for the received data based on whether the communication device can reconstruct the data packet.

8. The communication device of claim 7,
wherein the one or more processors are configured to determine that the communication device is to request the retransmission for the received data if the communication device is to receive additional data for reconstructing the data packet.

9. The communication device of claim 8,
wherein the additional data is error correction data.

10. The communication device of claim 5,
wherein the one or more processors are further configured to download the received data stored in the off-chip memory to the on-chip memory if the receiver receives the retransmission for the received data,
wherein the received data stored in the off-chip memory is from a previous transmission of the data packet.

11. The communication device of claim 10,
wherein the one or more processors are configured to avoid downloading data other than the data received in the previous transmission of the data packet from the off-chip memory to the on-chip memory.

12. The communication device of claim 1,
wherein the receiver is a radio receiver, and
wherein the communication channel is a radio communication channel.

13. The communication device of claim 1,
wherein the one or more processors are configured to store the received data in the on-chip memory independent of whether the communication device is to request the retransmission for the received data.

14. The communication device of claim 1,
wherein the chip is a modem chip.

15. The communication device of claim 1,
wherein the one or more processors are further configured to transfer the received data from the on-chip memory to the off-chip memory to store the received data into the off-chip memory.

16. The communication device of claim 1, wherein the one or more processors are further configured to:
update the received data stored in the on-chip memory if the receiver receives the retransmission for the received data in accordance with a retransmission protocol, and
transfer new data received with the retransmission and the updated received data to the off-chip memory if the communication device is to request a further retransmission.

17. The communication device of claim 1,
wherein the one or more processors are configured to avoid transferring one or more portions of the received data to the off chip memory that are already stored in the off chip-memory.

18. The communication device of claim 1,
wherein the chip further includes the one or more processors.

19. The communication device of claim 1, further comprising:
a decoder configured to perform a cyclic redundancy check on the stored data from the on-chip memory,
wherein the one or more processors are configured to determine whether the communication device is to request the retransmission for the received data based on a result of the cyclic redundancy check.

20. A method for storing data in a communication device, the method comprising:
receiving data via a communication channel by the communication device;
storing the received data in an on-chip memory of a chip of the communication device;
determining whether the communication device is to request a retransmission for the received data;
storing the received data, from the on-chip memory, into an off-chip memory of the communication device in response to determining the communication device is to request the retransmission for the received data; and
preventing storing of the received data in the off-chip memory in response to determining the communication device is to omit the request for the retransmission for the received data,
wherein said receiving the data occurs via a retransmission protocol, and
wherein the on-chip memory has a size that is larger than a retransmission protocol process size of the retransmission protocol but smaller than two times the retransmission protocol process size of the retransmission protocol.

21. A non-transitory computer-readable medium having instructions stored thereon, wherein the instructions, when executed by one or more processors of a communications device, cause the one or more processors to perform:
receiving data via a communication channel by the communication device;
storing the received data in an on-chip memory of a chip of the communication device;
determining whether the communication device is to request a retransmission for the received data;
storing the received data, from the on-chip memory, into an off-chip memory of the communication device in response to determining the communication device is to request the retransmission for the received data; and
preventing storing of the received data in the off-chip memory in response to determining the communication device is to omit the request for the retransmission for the received data,
wherein said receiving the data occurs via a retransmission protocol, and
wherein the on-chip memory has a size that is larger than a retransmission protocol process size of the retransmission protocol but smaller than two times the retransmission protocol process size of the retransmission protocol.

22. A communication device comprising:
a chip including an on-chip memory, and implementing, at least partially, a receiver, wherein the receiver configured to:
receive data via a communication channel; and
store the received data in the on-chip memory;
an off-chip memory; and
one or more processors configured to:
determine whether the communication device is to request a retransmission for the received data,
store the received data, from the on-chip memory, into the off-chip memory in response to determining the communication device is to request the retransmission for the received data, and
prevent storing of the received data in the off-chip memory in response to determining the communication device is to omit the request for the retransmission for the received data,
wherein the receiver has a first connection to the on-chip memory for storing the received data in the on-chip memory,
wherein the receiver has a second connection to the off-chip memory for storing the received data in the off-chip memory, and
wherein the first connection has at least one of a lower latency or a higher bandwidth than the second connection.

23. A method for storing data in a communication device, the method comprising:
receiving data via a communication channel by a receiver of the communication device;
storing the received data in an on-chip memory of a chip of the communication device;
determining whether the communication device is to request a retransmission for the received data;
storing the received data, from the on-chip memory, into an off-chip memory of the communication device in response to determining the communication device is to request the retransmission for the received data; and
preventing storing of the received data in the off-chip memory in response to determining the communication device is to omit the request for the retransmission for the received data,
wherein the receiver has a first connection to the on-chip memory for storing the received data in the on-chip memory,
wherein the receiver has a second connection to the off-chip memory for storing the received data in the off-chip memory, and
wherein the first connection has at least one of a lower latency or a higher bandwidth than the second connection.

24. A non-transitory computer-readable medium having instructions stored thereon, wherein the instructions, when executed by one or more processors of the communications device, cause the one or more processors to perform:
receiving data via a communication channel by a receiver of the communication device;
storing the received data in an on-chip memory of a chip of the communication device;
determining whether the communication device is to request a retransmission for the received data;
storing the received data, from the on-chip memory, into an off-chip memory of the communication device in response to determining the communication device is to request the retransmission for the received data; and
preventing storing of the received data in the off-chip memory in response to determining the communication device is to omit the request for the retransmission for the received data,
wherein the receiver has a first connection to the on-chip memory for storing the received data in the on-chip memory,
wherein the receiver has a second connection to the off-chip memory for storing the received data in the off-chip memory, and wherein the first connection has at least one of a lower latency or a higher bandwidth than the second connection.

\* \* \* \* \*